(12) United States Patent
Franks et al.

(10) Patent No.: US 12,485,392 B2
(45) Date of Patent: Dec. 2, 2025

(54) MIXING DEVICE AND METHODS OF OPERATION

(71) Applicant: Bridgestone Corporation, Tokyo (JP)

(72) Inventors: William Franks, Canal Fulton, OH (US); Timothy L. Tartamella, Boston Heights, OH (US)

(73) Assignee: Bridgestone Corporation, Chuo-ku (JP)

( * ) Notice: Subject to any disclaimer, the term of this patent is extended or adjusted under 35 U.S.C. 154(b) by 911 days.

(21) Appl. No.: 17/767,026

(22) PCT Filed: Oct. 8, 2020

(86) PCT No.: PCT/US2020/054820
§ 371 (c)(1),
(2) Date: Apr. 6, 2022

(87) PCT Pub. No.: WO2021/072104
PCT Pub. Date: Apr. 15, 2021

(65) Prior Publication Data
US 2022/0362727 A1    Nov. 17, 2022

Related U.S. Application Data

(60) Provisional application No. 63/018,439, filed on Apr. 30, 2020, provisional application No. 62/912,399, filed on Oct. 8, 2019.

(51) Int. Cl.
*B01F 31/00* (2022.01)
*B01F 23/40* (2022.01)
(Continued)

(52) U.S. Cl.
CPC .............. *B01F 31/65* (2022.01); *B01F 23/43* (2022.01); *B01F 23/47* (2022.01); *B01F 23/482* (2022.01);
(Continued)

(58) Field of Classification Search
CPC ............ B01F 31/651; B01F 2101/2805; B01F 2035/99; B01F 2215/0495; B01F 23/47; B01F 23/482; B01F 33/813; B01F 23/49
See application file for complete search history.

(56) References Cited

U.S. PATENT DOCUMENTS 6,280,074 B1    8/2001  Kuroda et al.
6,305,831 B1   10/2001  Gathmann et al.
(Continued)

OTHER PUBLICATIONS

International Search Report and Written Opinion for corresponding PCT/US2020/054820 dated Jan. 29, 2021 (12 pp).

*Primary Examiner* — Anshu Bhatia
(74) *Attorney, Agent, or Firm* — Meredith E. Hooker; Arthur M. Reginelli

(57) ABSTRACT

Apparatus for mixing polymer, the apparatus comprising (i) a mixer housing including an internal chamber, said internal chamber having first and second sections in fluid communication with each other through a passageway; (ii) a first ram received in said first section; and (iii) a second ram received in said second section, where the apparatus is adapted to receive a composition including polymer within said internal chamber and move said composition between said first and second chambers through said passageway by operation of said first and second rams.

23 Claims, 8 Drawing Sheets

(51) Int. Cl.
  *B01F 23/43* (2022.01)
  *B01F 23/47* (2022.01)
  *B01F 31/65* (2022.01)
  *B01F 33/81* (2022.01)
  *B01F 35/00* (2022.01)
  *B01F 35/92* (2022.01)
  *B01F 35/90* (2022.01)
  *B01F 101/00* (2022.01)

(52) U.S. Cl.
  CPC ............ *B01F 23/49* (2022.01); *B01F 33/811* (2022.01); *B01F 33/813* (2022.01); *B01F 35/189* (2022.01); *B01F 35/92* (2022.01); *B01F 2035/99* (2022.01); *B01F 2101/2805* (2022.01); *B01F 2215/0495* (2013.01)

(56) References Cited

U.S. PATENT DOCUMENTS

| | | |
|---|---|---|
| 7,033,067 B2 | 4/2006 | Sentmanat |
| 7,878,704 B2 * | 2/2011 | Bonnard ........... B01F 35/71775 |
| | | 366/268 |
| 8,114,320 B2 | 2/2012 | Losch et al. |
| 10,179,429 B2 | 1/2019 | De La Calle Lizarazu et al. |
| 2004/0120217 A1 * | 6/2004 | Sentmanat ................ B29B 7/90 |
| | | 366/267 |

* cited by examiner

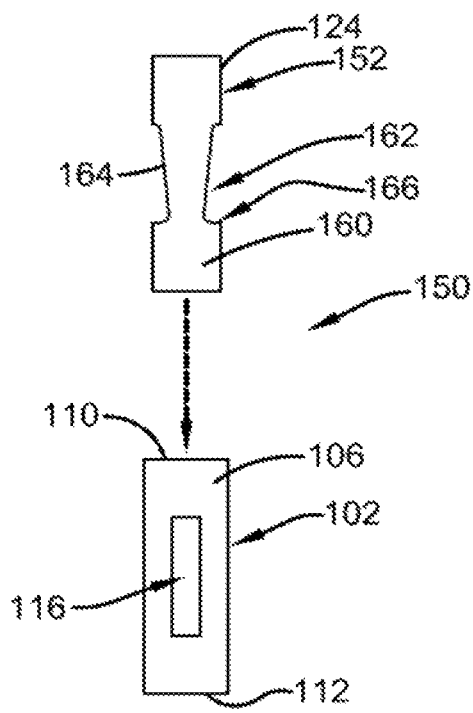 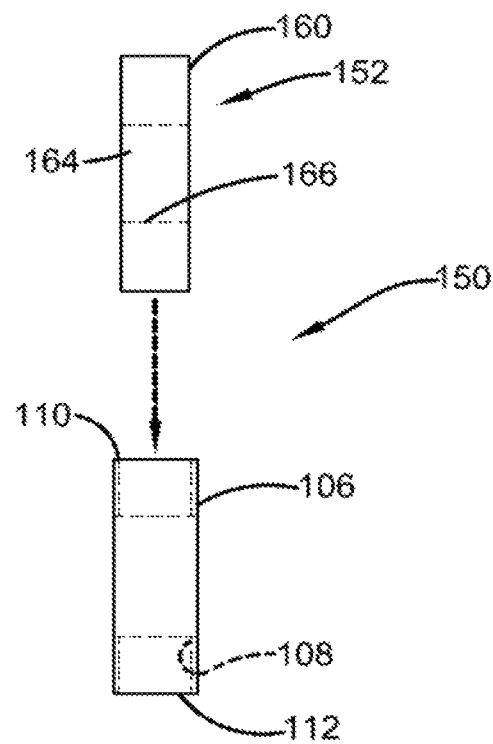
FIG. 6A  FIG. 6B
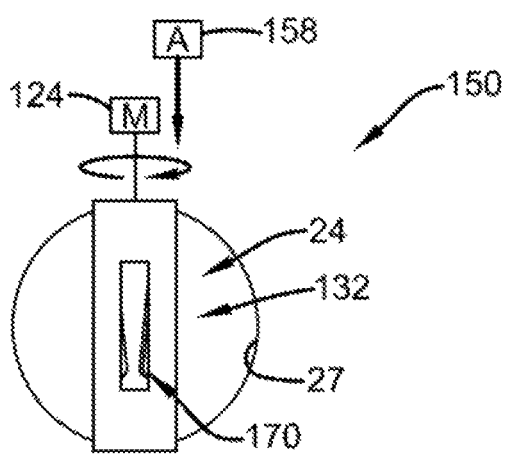 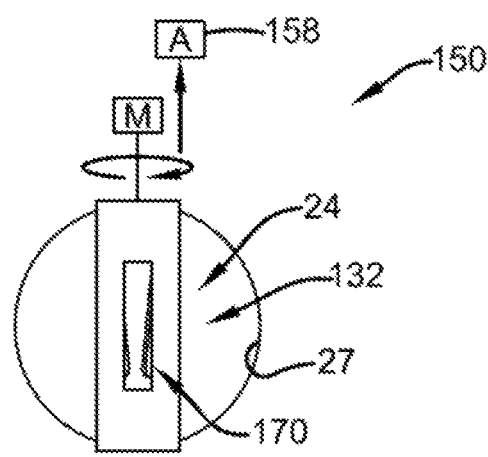
FIG. 6C  FIG. 6D

MIXING DEVICE AND METHODS OF OPERATION

This application is a National-Stage application of PCT/US2020/054820 filed on Oct. 8, 2020, which claims the benefit of U.S. Provisional Application Ser. No. 62/912,399 filed on Oct. 10, 2019, and U.S. Provisional Application Ser. No. 63/018,439 filed on Apr. 30, 2020, which are incorporated herein by reference.

FIELD OF THE INVENTION

Embodiments of the present invention relate to a device for mixing relatively small quantities of polymer material, and its methods of operation.

BACKGROUND OF THE INVENTION

The use of combinatorial techniques to generate libraries of fluid, chemical and/or biological compounds is known in the art. Once these libraries are generated, it is desirable to screen or characterize the compounds to determine if the desired properties are present, such as physical and/or chemical properties. Most techniques developed for screening and characterization of combinatorial libraries are sequential, which involve sample preparation or sample transfer steps, which are generally labor-intensive, time-consuming, and expensive for large libraries or arrays of several compounds. Most current techniques are also problematic in that relatively large quantities of material are needed, which is wasteful. This approach necessitates a review of only the most promising samples and ignores obscure variations that might lead to unexpected, but worthwhile compounds.

The issue is even more problematic when the target compositions are rubber compositions since the preparation of a large number of relatively small samples is not trivial. For one, the mixing of rubber compositions, which includes the incorporation of reinforcing fillers and other additives into a rather viscous matrix (i.e. the uncured rubber component), may require high temperatures and/or significant shear forces. This is highly distinct from situations where the matrix is a fluid or molten thermoplastic polymer. Again, rubber materials require high shear forces to obtain an adequate mixture. Historically, these high shear forces have necessitated relatively large samples that are placed within robust mixing apparatus such as Brabender mixers.

The development and optimization of rubber polymer and rubber compounds is desirable in many industries such as the tire industry. The use of combinatorial techniques and high-throughput screening processes has nonetheless been hindered by several factors including the inability to achieve adequate compound mixtures for a relatively large number of relatively small samples. Accordingly, there is a need in the art to develop devices and processes to process a large number of relatively small samples.

SUMMARY OF THE INVENTION

One or more embodiments of the present invention provide an apparatus for mixing polymer, the apparatus comprising (i) a mixer housing including an internal chamber, said internal chamber having first and second sections in fluid communication with each other through a passageway; (ii) a first ram received in said first section; and (iii) a second ram received in said second section, where the apparatus is adapted to receive a composition including polymer within said internal chamber and move said composition between said first and second chambers through said passageway by operation of said first and second rams.

Still other embodiments of the present invention provide a method for mixing a polymer, comprising (i) providing an apparatus comprising a mixer housing including an internal chamber, said internal chamber having first and second sections in fluid communication with each other through a passageway, a first ram received in said first section, and a second ram received in said second section; (ii) charging a composition including a polymer to said internal chamber between said first and second rams; (iii) moving one of said ram in one of said sections to force the composition through said passageway and into the other of said sections; (iv) moving the other of said rams to force the composition back through said passageway and into the other of said sections; and (v) repeating the moving of said rams.

Yet other embodiments of the present invention provide an assembly comprising two or more apparatus for mixing polymer, at least one apparatus comprising (i) a mixer housing including an internal chamber, said internal chamber having first and second sections in fluid communication with each other through a passageway; (ii) a first ram received in said first section; and (iii) a second ram received in said second section, where the apparatus is adapted to receive a composition including polymer within said internal chamber and move said composition between said first and second chambers through said passageway by operation of said first and second rams.

BRIEF DESCRIPTION OF THE DRAWINGS

FIGS. 6A-D are schematic views of another alternative pin configuration showing assembly and operational views thereof according to one or more embodiments of the present invention.

DETAILED DESCRIPTION OF ILLUSTRATIVE EMBODIMENTS

Embodiments of the invention are based, at least in part, on the discovery of a device for mixing relatively small quantities of rubber polymer. Although suitable for mixing thermoplastic polymer materials, the device can advantageously mix relatively small quantities of rubber material and various additives, such as particulate filler materials, to form vulcanizable rubber compositions. Advantageously, the mixing device is able to impart high shear on relatively small quantities of rubber in a timely manner.

Figure 1:
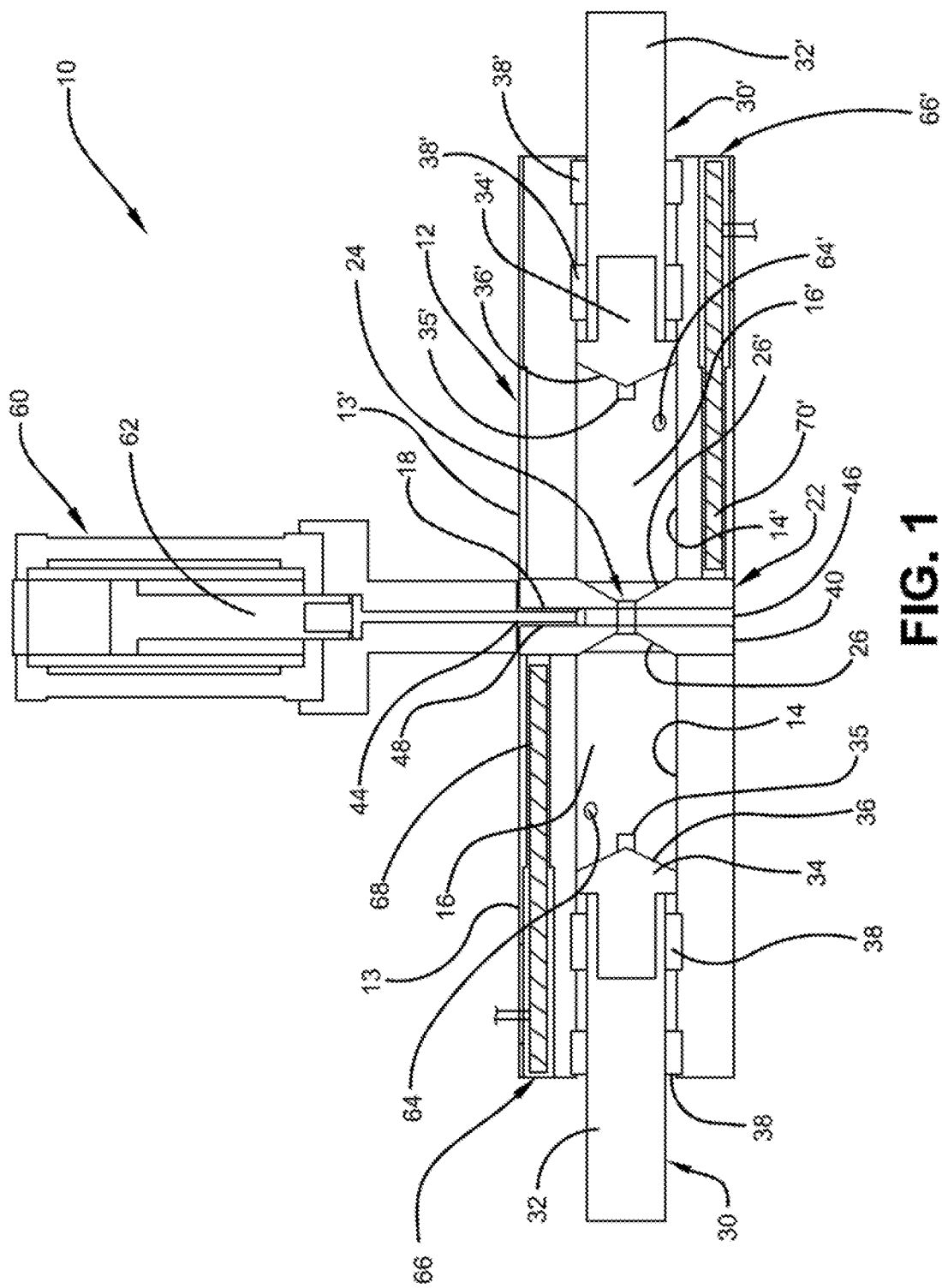
FIG. 1 is a schematic side, cross-sectional view of a mixing apparatus of one or more embodiments of the present invention where the pin is positioned away from the passageway of the mixer.
Figure 2:
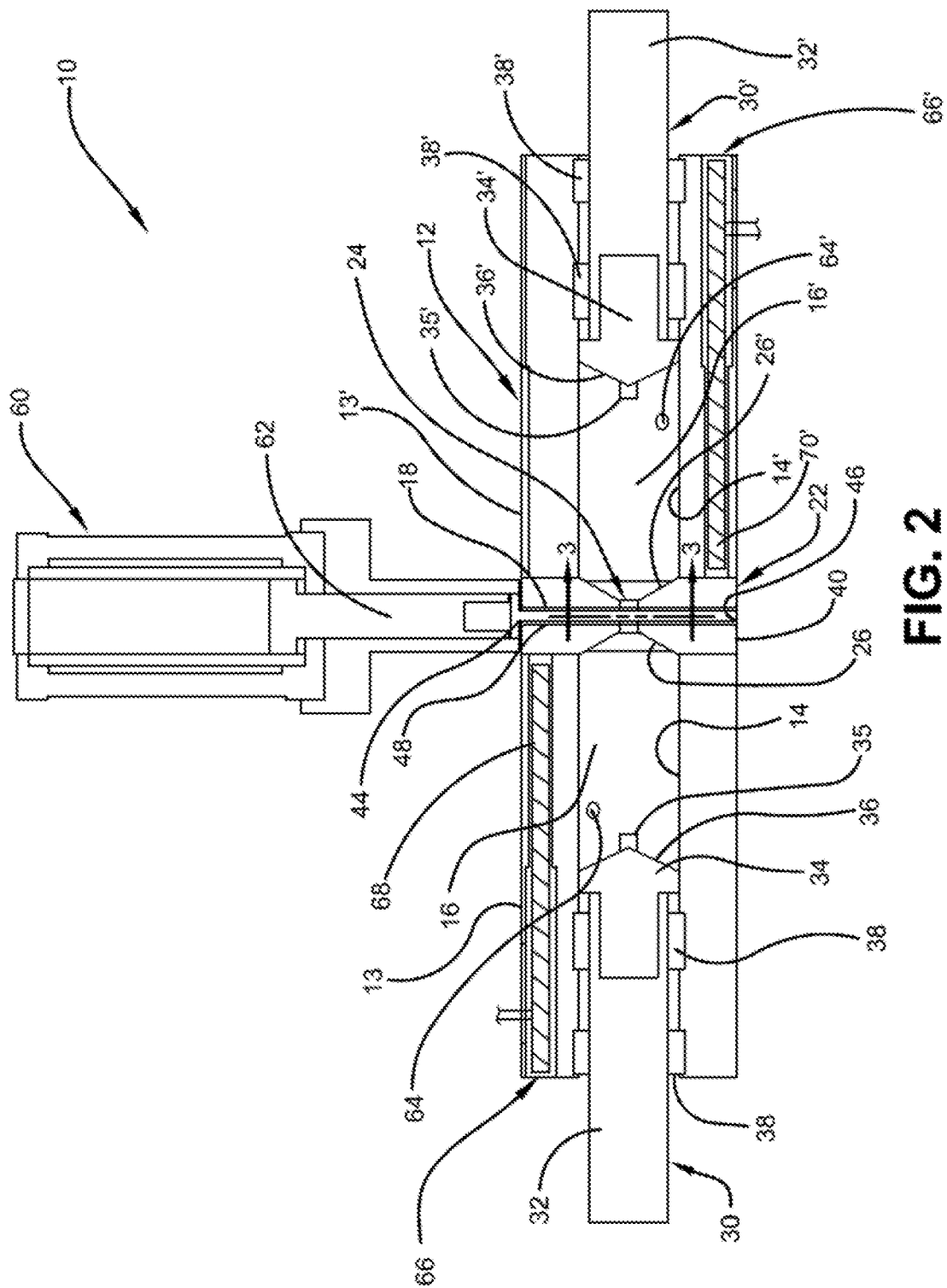
FIG. 2 is a schematic side, cross-sectional view of a mixing apparatus of one or more embodiments of the present invention where the pin is positioned to partially occlude the passageway of the mixer.

FIGS. 1 and 2 show a mixer 10, which includes a mixer housing 12. Housing 12 includes a first portion 13, which may also be referred to as left portion 13, a second portion 13', which may also be referred to as right portion 13', and a mix head wall 22 there between. In one or more embodiments, first portion 13 is, unless otherwise specified, a mirror image of second portion 13'. Accordingly, at least a portion of the following description will refer to first portion 13, and it will be understood that the description will be applicable to second portion 13' with corresponding numerals specified in the drawings (e.g. 14 and 14').

First portion 13 includes an internal chamber wall 14, which defines the circumferential walls of a mixer chamber 16. Internal chamber 16 is also defined by tapered surface 26 of mix head wall 22. Chamber 16' is similarly defined by tapered surface 26'. Tapered surfaces 26, 26' face away from each other and toward their respective mixer chambers 16, 16'. As shown, mixing head 22 may substantially bisect the mixer chambers 16, 16'.

A passageway 24 connects first chamber 16 to second chamber 16' and places the respective chambers in fluid communication with each other. Passageway 24, which may also be referred to as orifice 24, may have a circular cross-section, as shown, which has a small diameter relative to the diameter of mixer chambers 16, 16'. In one or more embodiments, passageway 24 has a diameter that is substantially smaller than the diameter of chambers 16, 16'. In one or more embodiments, the ratio of the diameter of mix chambers 16, 16' to the diameter of the passageway is great than 5:1, in other embodiments greater than 10:1, in other embodiments greater than 15:1, and in other embodiments greater than 20:1.

In one or more embodiments, passageway 24 is concentrically aligned (i.e. coaxial) with the axis of the mixer chambers 16, 16'. In one or more embodiments, mixer 10 may include more than one orifice, wherein the multiple orifices are grouped and/or aligned with the mixer chamber.

In one or more embodiments, mixer housing 12 includes an optional cross bore 18 extending substantially perpendicularly there through. As shown, cross bore 18 extends through mix head wall 22 substantially perpendicularly with the axis of mixer chambers 16, 16' and substantially perpendicularly with the axis of passageway 24. Cross bore 18 includes inlet opening 44 and outlet opening 46. As will be described in greater detail below, a movable pin 48 can be inserted into cross bore 18 through inlet opening 44. As will be explained in greater detail below, pin 48 has a diameter that is smaller than the diameter of passageway 24. Mixer 10, and in particular inlet opening 44 and outlet opening 46, can be adapted to seal and maintain adequate pressure within chambers 16, 16' during use of the mixer while pin 48 is disposed within cross bore 18. As shown in FIG. 1, pin 48 is only partially inserted into cross bore 18 and does not occlude passageway 24. In FIG. 2, pin 48 is fully inserted into cross bore 18 and partially occludes passageway 24.

Figure 3:
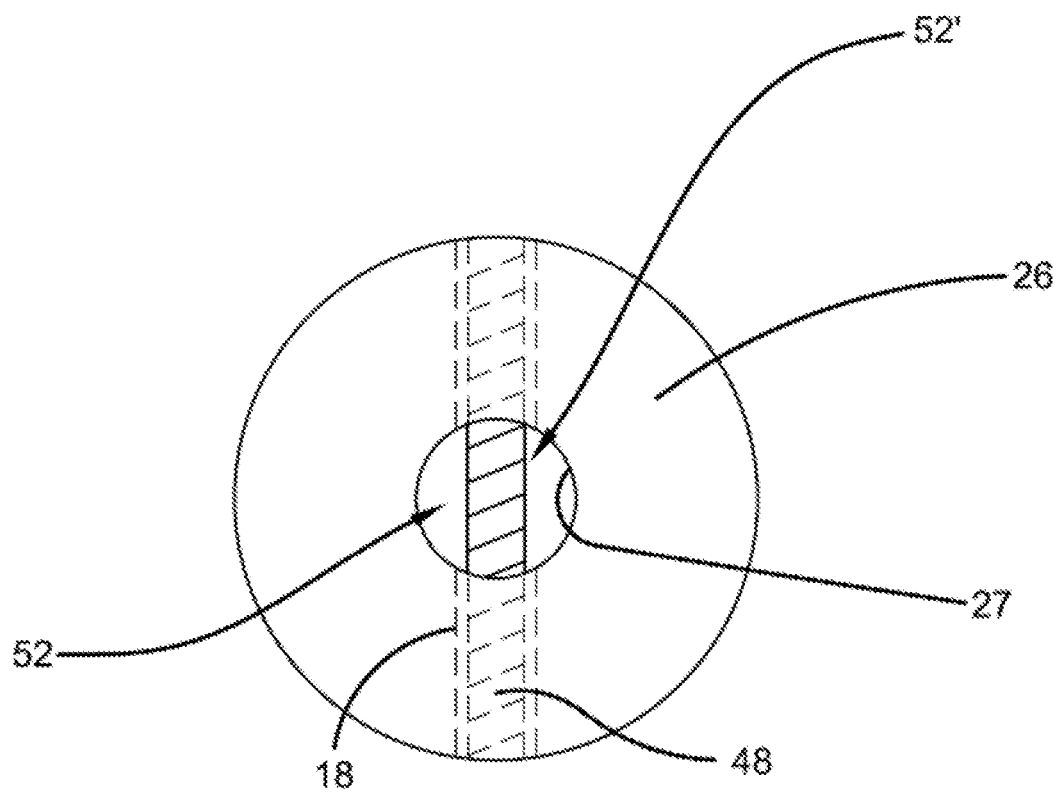
FIG. 3 is a cross-sectional view taken along lines 3-3 of FIG. 2 showing an intersection of a pin within a passageway.

The relationship between pin 48 and passageway 24 can be described with reference to FIG. 3. As shown, tapered wall 26 includes outer circumferential edge 26, which is where tapered wall 26 meets internal wall 14 of housing 12. Tapered wall 26 includes an inner circumferential edge 27, which is where tapered wall meets passageway 24. Pin 48 is positioned in bore hole 18 and traverses passageway 24 and only partially occludes passageway 24, thereby creating first and second partial or reduced passageways 52, 52'. It will be appreciated that passageways 52, 52' are defined by a portion of edge 27 and a portion of pin 48. As suggested above, passageway 24 has a circular cross-section, and therefore circumferential edge 27 is circular. Skilled artisans will appreciate that the geometry of passageway can be altered, which in turn will alter the configuration of edge 27. Likewise, edge 27 may be a sharp edge, or in other embodiments, it may be rounded. And, in certain embodiments, edge 27 may be serrated or otherwise irregular. In any event, pin 48 narrows the cross-sectional area of the passageway such that the spaced available for movement of material through the passageway is further reduced relative to the size, such as the diameter or cross-sectional area, of the respective chambers 16, 16'. In one or more embodiments, the ratio of the cross-sectional area of mix chambers 16, 16' to the cross-sectional area of the passageway when partially occluded by pin 48, is great than 7:1, in other embodiments greater than 15:1, in other embodiments greater than 25:1, in other embodiments greater than 35:1, in other embodiments greater than 50:1, in other embodiments greater than 80:1, in other embodiments greater than 100:1, and in other embodiments greater than 150:1.

Returning to FIGS. 1 and 2, mixer 10 includes rams 30, 30', which each include ram bodies 32, 32' and ram tips 34, 34', which may also be referred to as ram heads 34, 34'. Rams 30, 30' may be slidably and rotatably received within chambers 16, 16' respectively. Rams 30, 30' are mechanically attached (not shown), either directly or indirectly, to a device, such as a hydraulic cylinder, that can move the rams axially within the respective chambers. At least a portion of ram tips 34, 34' contact internal walls 14, 14' of housing 12 with adequate friction to create a seal between ram tips 34, 34' and respective internal walls 14, 14' (i.e. in such a way so that material does not pass between the ram tips 34, 34' and the chamber walls 14, 14'). In one or more embodiments, ram tips 34, 34' are detachable from bodies 32, 32' (i.e. detachably connected). As a result, ram heads 34, 34' may be replaced if worn or if a different material ram head is suitable for mixing particular types of samples.

In one or more embodiments, ram tips 34, 34' include lead portions 36, 36', which may also be referred to as contact surfaces 36, 36'. In one or more embodiments, lead portions 36, 36' may be configured to tightly mate with tapered surfaces 26, 26' of mix wall 25. In other words, lead portions 36, 36' may have a similar, but complementary, tapered surface so that lead surfaces 36, 36' will fit snugly against walls 26, 26' when engaged. In one or more embodiments, tips 34, 34' optionally include a protrusion 35, 35' at the apex thereof. These protrusions may be configured to at least partially enter into passageway 24 when lead surfaces 36, 36' are engages with walls 26, 26'. For example, protrusions 35, 35' may have a complementary shape to facilitate entry or partial entry into passageway 24. In these or other embodiments, the size and configuration of tips 34, 34', as well as lead surfaces 36, 36', may be sized and configured so as to facilitate movement of the polymer samples between chambers 16, 16' and through passageway 24. For example, lead surfaces 36, 36' may have a slightly different angular value with respect to the apex thereof than does the surfaces 26, 26' with respect to the center of the orifice 24. In other words, the angle of tapered surface 26 and the angle of lead surface 36 may not add up to 180°. This angular mismatch may facilitate the mixing and passage of the materials from chamber 16 to 16' or vice versa. Also, this mismatch may alleviate material becoming trapped between the surfaces.

As shown in FIGS. 1 and 2, mixer 10 may also include bushings 38, 38' interposed between the outer diameter of ram bodies 32, 32', and chamber walls 14, 14' respectively. In one or more embodiments, ram bodies 32, 32' are sized smaller than the diameter of chambers 16, 16' so that ram bodies 32, 32' do not wear against walls 14, 14'. Bushings 38, 38' serve to keep rams 30, 30' aligned within chambers 16, 16' relative to the axis thereof. As the skilled person will appreciate, it may be advantageous for bushings 38, 38' to be removably attached to housing 12 so that the bushings can be replaced when worn given their contact with bodies 32, 32' respectively during operation of mixer 10.

In one or more embodiments, pin 48 may be affixed, either directly or indirectly, to an actuator 60 that may be fixedly or removably mounted to housing 12. In one or more embodiments, actuator 60 includes a shaft 62 that is connected to pin 48 and a drive source (not shown), which provides for movement of the pin into and out of the orifice as needed during operation of the mixer. Shaft 62 may be driven by an electric motor, hydraulic forces, or other mechanical forces.

As also shown in FIGS. 1 and 2, mixer housing 12 may include a port 64. As shown, mixer housing 12 may include multiple ports 64, 64', although housing 12 may include more than 2, optionally 4 and optionally 6 ports (not shown). The ports, which may also be referred to as multi-purpose ports, extend through chamber walls 14, 14' and provide an inlet and/or outlet to chambers 16, 16'. In one or more embodiments, ports 64, 64' provide an inlet in through which material to mixed in the mixer can be charged to chambers 16, 16', an outlet through volatile compounds to be vented from chambers 16, 16', and/or through which additional materials, such as nitrogen gas, can be fed to chambers 16, 16'. As the skilled person will appreciate, the ports can be sealed, capped, or otherwise adapted to maintain materials within chambers 16, 16' and/or prevent undesirable collection of materials at the inlet/outlet; for example, the port can be equipped with a port septa.

Additionally, mixer 10 may include sensors or probes associated with sensors that extend into the chambers 16, 16' through housing 12. These sensors may include, but are not limited to, temperature, moisture, and pressure sensors. Housing 12 may also include conduits 66 that are laterally configured into the member housing such that the conduit is connected at one end to the mixer housing 12 and that the other end is open to an ambient air surrounding the mixer housing 12.

In one or more embodiments, mixer 10 may provide heating and/or cooling of chambers 16, 16'. For example, housing 12 may include conduits 66 that house heating or cooling elements 70, 70'. These conduits may be substantially aligned and parallel with the axis of or concentrically around chambers 16, 16'. In one or more embodiments, heating or cooling elements 70, 70' may include an electrical heating elements or cooling tubes.

Regarding the overall construction of mixer 10, first portion 13, second portion 13', and mix head wall 22 may be integral with each other (i.e. housing 10 may be a unitary or single-component component). In other embodiments, housing 12 includes a multicomponent design where mix head wall 22 is in the form of a die plate with first portion 13 and second portion 13' affixed thereto. For example, first portion 13 and second portion 13' can be affixed, by way of mechanical fasteners, to respective sides of die plate 22.

Materials of Construction

The skilled person will be able to readily select appropriate materials for the construction of the mixer in view of the present disclosure. For example, first portion 13, second portion 13', and die plate 22 may be constructed of stainless steel or other metal alloys having sufficient strength to withstand the heat and mechanical forces that will be experienced when subjecting rubber polymer to high-energy mixing. Pin 48 will likewise require construction from high stress metals and metal alloys.

In one or more embodiments, certain components of mixer 10 may be constructed of polymeric or composite materials, especially where the components are likely to undergo friction and wear. For example, ram tips 33, 33', as well as bushings 38, 38', may be constructed of lubricious materials including polymers and polymer composites with low coefficient of friction.

Alternate pin Configurations

Figure 4:
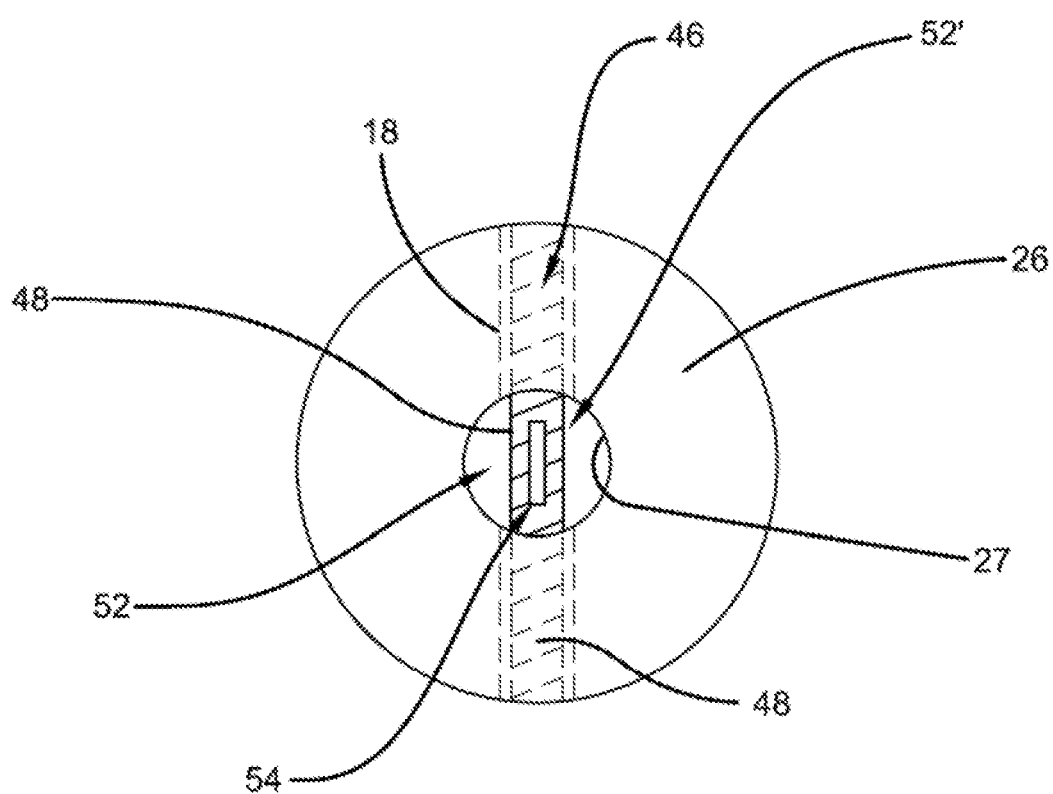
FIG. 4 is a cross-sectional view taken along lines 3-3 of FIG. 2 showing an intersection of an alternate pin within a passageway.

In alternate embodiments, as shown in FIG. 4, pin 48 may have at least one opening 54, which as shown has a generally rectangular cross-sectional shape. In one or more embodiments, opening 54 is in the form of a slit 54 extending transversely therethrough and extending axially along the length of pin 48 for a distance substantially similar to the diameter of passageway 24. In other embodiments, multiple slits or other shaped openings may be provided. Skilled artisans will also appreciate that multiple pins with or without slits or the like may extend through the orifice. The number of pins and their respective number of openings and passages assist in imparting shear forces in the mixing operation as will be discussed.

Figure 5A:
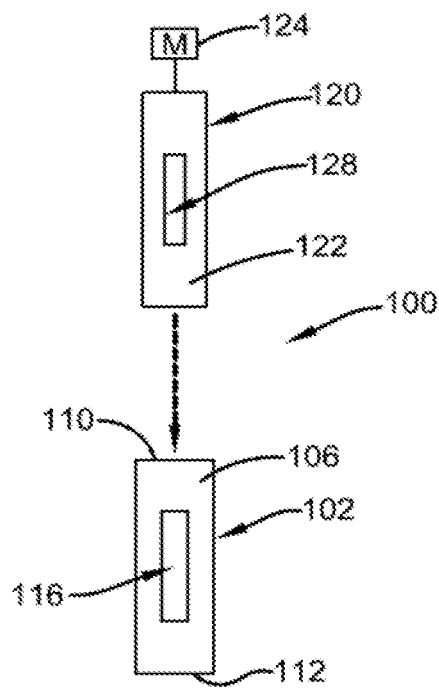
FIGS. 5A-D are schematic views of an alternative pin configuration showing assembly and operational views thereof according to one or more embodiments of the present invention.
Figure 5B:
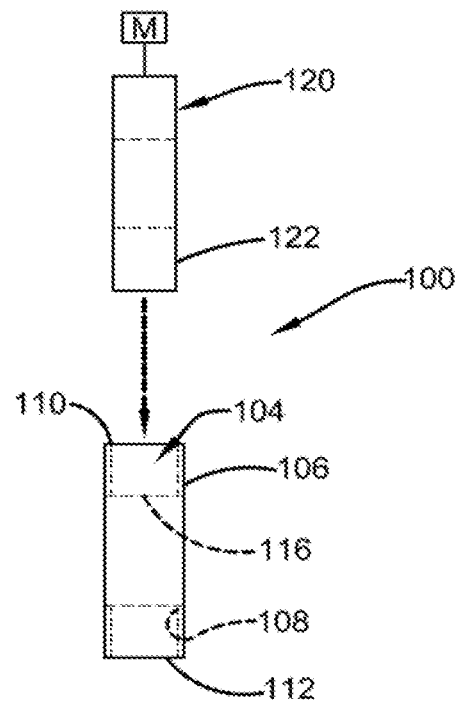

Another alternate pin assembly 100 is shown in FIGS. 5A-D. With reference to FIGS. 5A and 5B, pin configuration 100 includes an outer cylinder 102 that may have an axial opening 104 extending therethrough or of sufficient depth to enable operation of the pin configuration 100. Outer cylinder 102 includes an outer surface 106 and a substantially concentric inner surface 108 that defines axial opening 104. Outer cylinder 102 has an upper end 110 opposite a lower end 112. Either end 110 or 112 may be movable by a mechanism (not shown) so as to insert and retract outer cylinder 102 into and out of the bore hole 18. Extending through outer cylinder 102 are a pair of opposed wall slits 116. In particular, each wall slit 116 extends from outer surface 106 transversely through the cylinder to the inner surface 108. Each wall slit may be of the same size or of a different size and both will intersect with axial opening 104.

Received within outer cylinder 102, and in particular axial opening 104, may be an inner cylinder 120. In this embodiment, inner cylinder 120 is slidably and rotatably received within axial opening 104. The inner cylinder has an outer surface 122 that is positioned adjacent the outer cylinder's inner surface 108 but is sized so as to allow for slidable and rotational movement therein. Coupled to inner cylinder 120 may be a motor 124 that rotates inner cylinder 120 within axial opening 104 in either direction. In some embodiments, motor 124 may also include a linear actuator for insertion and retraction of inner cylinder 120 with respect to outer cylinder 102. Extending through inner cylinder 120 is a transverse opening 128 that may be alignable with either or both of wall slits 116.

Figure 5C:
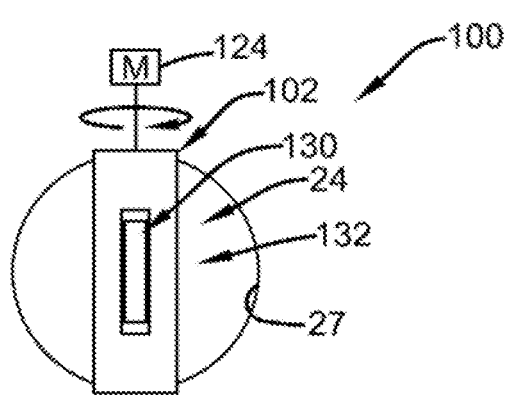
Figure 5D:
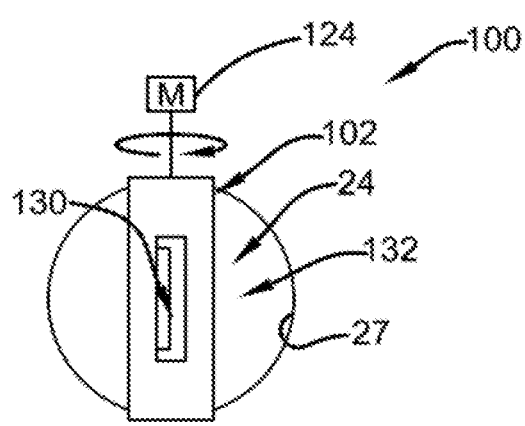

As best shown in FIG. 5C, transverse opening 128 may be fully aligned with wall slit 116 so as to form a pin opening 130 through pin configuration 100. FIG. 5D shows the inner cylinder partially rotated so as to provide a reduced profile pin opening 130. As shown in FIGS. 5C and 5D, passages 132 are provided between edge 27 of passageway 24 and outer surface 106 of the outer cylinder. Skilled artisans will appreciate that in operation motor 124 may rotate (in either direction) the inner cylinder's position during movement of the rams back and forth or, in the alternative, may rotate the inner cylinder to a predetermined position in either direction (e.g. a reduced profile pin opening) prior to initiation of the ram movement. It will also be appreciated that slits 116 and transverse opening 128 may be any shape or combination of shapes that facilitate mixing.

Referring now to FIGS. 6A-D, an alternative pin configuration is designated generally by the numeral 150. In this configuration, outer cylinder 102 is substantially the same as the outer cylinder employed in the pin configuration 100, but the inner cylinder is configured differently. Namely, an inner cylinder 152 may be rotatable by a motor 154 and/or linearly moved by an actuator 158. The inner cylinder 152 includes an outer surface 160 that may have a transverse opening 162 formed on outer surface 160. Transverse opening 162 may be in the form of a notch on opposed sides of outer surface 160, but skilled artisans will appreciate that other shapes of a void may be imparted on the outer surface so as to provide other variations of a transverse opening. In the embodiment shown, outer surface 160 provides for at least one tapered side 164 that is angularly and inwardly directed from outer surface 160 to a base 166, which in the present embodiment perpendicularly extends from the end of tapered side 164 to outer surface 160. Similar to the previous embodiment, inner cylinder 152 is rotatably and slidably received in the outer cylinder 102 so that the transverse opening 162 is at least partially aligned with the wall slits 116.

As best shown in FIGS. 6C and 6D, movement of inner cylinder 152 with respect to outer cylinder 102 provides for various sizes and shapes of openings that may be utilized during the mixing process. As best shown in FIG. 6C, inner cylinder 152 is substantially fully inserted so that it occludes or blocks a substantial portion of wall slits 116 provided by the outer cylinder. This occlusion forms a pin opening 170 that may be adjusted by rotational and/or lateral movement of the inner cylinder. As shown in FIG. 6C, the inner cylinder is substantially fully inserted into axial opening 104 so as to provide a relatively small pin opening 170. In FIG. 6D, the inner cylinder is somewhat retracted from the full insertion position so as to allow for a relatively larger pin opening 170. Skilled artisans will further appreciate that the size of the opening 170 may be adjusted by simultaneous rotation and linear movement of the inner cylinder with respect to the outer cylinder. This configuration provides for adjustments to the opening sides so as to increase or decrease the amount of shear imparted on to the sample that is being mixed. As in the previous embodiment, passages 132 are provided between edge 27 of the orifice 24 and outer surface 106.

Figure 7:
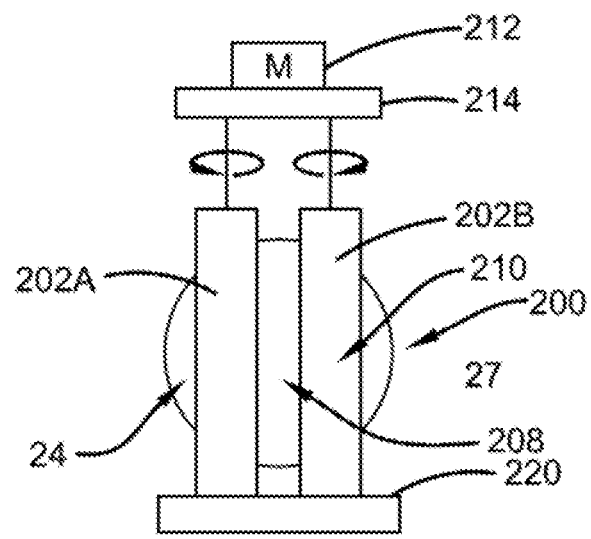
FIG. 7 is a schematic view of still another alternative pin configuration according to one or more embodiments of the present invention.

Referring now to FIG. 7, an alternative pin configuration is designated generally by the numeral 200. This configuration employs a pair of pins 202, which may also be referred to as rolls 202, which have corresponding suffixes A and B. Each pin 202 includes an outer pin surface 204, and the pins are spaced apart from one another so as to form a pin gap 208 therebetween. The pins also form passages 210 between the outer surfaces 204 and the edge 27 provided by the orifice 24.

Each pin 202 may be rotated by a motor 212 with a corresponding gear box 214. In this embodiment, the pins are rotated in tandem wherein one pin may be rotated clockwise and the other may be rotated counterclockwise. This configuration essentially functions to mill the material as it passes through pin gap 208 and/or passages 210. Skilled artisans will appreciate that the ends of pins 202 opposite motor 212 may be supported by appropriately sized bushings 220. In some embodiments, each pin may be individually driven by a separate motor 212 so as to avoid the need for a gear box 214. During the mixing operation, the rotational speed of the pins may be adjusted depending upon the type of material being mixed. And, the pins may have different types of surfaces such as smooth, knurled, or rough.

Figure 8A:
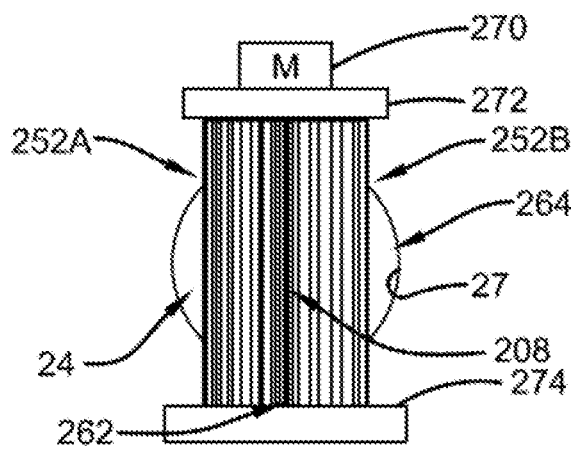
FIGS. 8A-B are schematic elevational and top views of yet another alternative pin configuration according to one or more embodiments of the present invention.
Figure 8B:
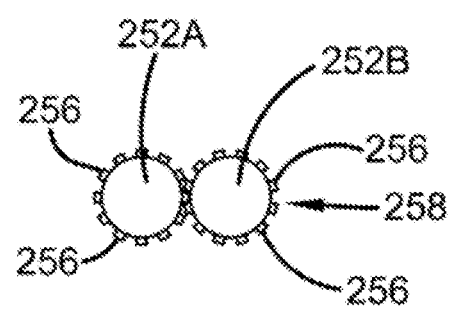

Referring now to FIGS. 8A and 8B, yet another pin configuration is designated generally by the numeral 250. In this particular embodiment, a pair of pins 252A,B are placed side by side, wherein each pin 252 provides for a plurality of lengthwise teeth 256 wherein a groove 258 is formed between each tooth. The pins are aligned such that the teeth and grooves of the adjacent pins 252 mesh with one another. Skilled artisans will further appreciate that there is a sufficient gap or pin interstice 262 formed between each pin 252A,B. As in other embodiments, each pin's outer surface 260 forms a passage 264 with edge 27 of orifice 24.

Each pin 252 may be rotated by a motor 270 and an interconnected gear box 272. As in the previous embodiment, bushings 274 may be used to support the ends of the pins 252A,B opposite the motor 270 so as to facilitate rotation of the pins during the mixing operation. In this particular embodiment, the teeth and grooves add a further shearing force to the material as it passes through the orifice. The speed and rotation of each pin may be controlled so as to further facilitate mixing.

Figure 9A:
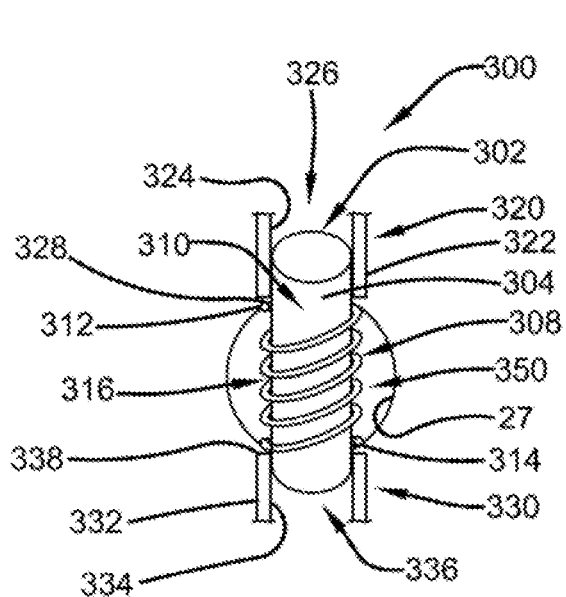
FIGS. 9A-B are schematic views of another alternative pin configuration of one or more embodiments of the present invention.
Figure 9B:
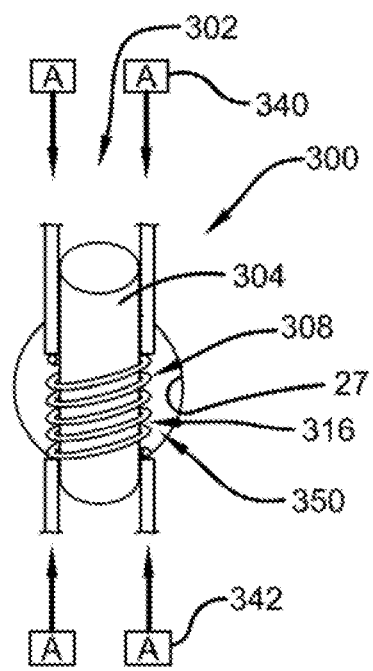

Referring now to FIGS. 9A and 9B, another pin configuration is designated generally by the numeral 300 and includes a solid cylinder pin 302 that has an outer surface 304. In this embodiment, outer surface 304 is relatively smooth, but it will be appreciated that in some embodiments outer surface 304 may be knurled or otherwise treated so as to facilitate mixing. Cylinder 302 carries and/or supports a helical wire spring 308. Spring 308 includes an inner diameter 310 that is sized to be slightly larger than the outer diameter of cylinder 302. The spring includes an upper end 312 opposite a lower end 314.

An upper collar 320 may be slidably received on one end of cylinder 302. Upper collar 320 includes an outer surface 322 that is opposite an inner surface 324, which defines a collar opening 326 that extends through at least a significant portion of the upper collar. Inner surface 322 and outer surface 324 are joined to one another by a compression surface 328, which is positioned adjacent upper end 312 of spring 308. Positioned opposite upper collar 320 on cylinder 302 is a lower collar 330. The lower collar has an outer surface 332 opposite an inner surface 334 that defines a collar opening 336 that extends axially through at least a significant portion of the lower collar 330. Connecting outer surface 332 to an inner surface 334 is a compression surface 338 that supports and carries a lower end 314 of spring 308. Associated with the upper collar may be an upper actuator 340 that axially moves the upper collar with respect to the cylinder 302. In a similar manner, a lower actuator 342 may be associated with lower collar 330, which in turn axially moves the lower collar 330 with respect to cylinder 302.

Actuators 340 and 342 may be selectively moved so as to move corresponding collars 320 and 330 so as to compress spring 308 or allow for its expansion. Outer surface 304 and spring 308 form passages 350 in conjunction with edge 27 of orifice 24. In some embodiments only one of the actuators may compress the spring or allow the expansion of the spring by moving one of the collars while the other collar is held in a fixed position. In operation, spring 308 may be compressed and expanded during operation of the rams so as to change the orifice or size of passages 350 as the material passes therethrough. As a result, the material may be further mixed during the mixing operation.

Operation of Mixer

As suggested above, the mixer of the present invention is uniquely adapted to mix relatively small quantities of rubber compound, which includes rubber polymer and various compounding additives that often included in rubber compositions, such as particulate fillers (e.g. carbon black and silica), waxes, oils, and curatives, and the like. It should be appreciated that the mixing device is adapted to impart high shear on relatively small quantities of rubber in a timely manner. Advantageously, the mixer is capable of distributive mixing and dispersive mixing.

In one or more embodiments, rubber polymer (e.g. a polydiene or polydiene copolymer), optionally together with one or more compounding additives (e.g. fillers, oils, resin, curatives and the like), is inserted into chamber 16 and/or chamber 16'. In one or more embodiments, this can be accomplished by charging a rubber formulation through one or more multi-purpose ports 64, 64'. Alternatively, this may be done by completely withdrawing one of the rams from its corresponding chamber and placing the unmixed material therein.

According to embodiments of the invention, a rubber formulation sample may be in form of a polymer cement (without or without compounding additives), which includes a relatively significant amount of solvent. As the solvent-rich composition is heated (either externally and/or through frictional heating during mixing), the solvent may be volatized and exit chambers 16, 16' through vent holes 64, 64'. The heaters and/or coolers may selectively assist in the desolventation or evaporation process.

In one or more embodiments, chambers 16, 16' are sized to mix samples having a volume of from about 10 to about 300 mL, in other embodiments from about 10 to about 100 mL, and in other embodiments from about 15 to about 50 mL. In particular embodiments, mixer 10 is adapted to mix sample with a volume of about 30 mL.

Once the material is loaded to the mixer, the rams 30, 30' are operated to transfer the rubber compound between chambers 16, 16' through passageway 24 and thereby subject the rubber compound to mixing. Where pin 48 partially occludes passageway 24, the movement of materials between chambers 16, 16' forces material through reduced passageways 52, 52', thereby offering greater shear. As the skilled person will appreciate, the movement of material between chambers 16, 16' takes place by operating rams 30, 30' in tandem and forcing the sample through the passageway 24. The transfer of material through passageway 24 can be repeated numerous times until the sample is fully mixed. In some embodiments, where rams 30, 30' operate independently, the ram located in the chamber in which the material is being received, instead of being fully retracted, may exert an opposing force so as to increase the shear forces being exerted on the material as it passes through the openings (e.g. passages and/or slits) in the passageway. The skilled person also appreciates that sequenced control of the rams may be employed to ensure adequate mixing of the material.

In one or more embodiments, rams 30, 30' may be hydraulically moved either in tandem or independently of one another. For example, they may be moved in a coordinated sequence for mixing the polymer material. In other embodiments, the rams may be moved by motorized linear actuators or ball screws. And, the rams may be spring biased so that they retract to their original position after the driving forces are removed from the rams. In some embodiments, the rams may not need to be spring-biased. The rate at which the rams move in the chamber may be regulated as needed depending upon the type of sample being mixed, the viscosity of the material being mixed (which may change during the mixing operation), as well as other factors.

Once the mixing is complete, rams 30, 30' can be retracted to a predetermined position away from the mixing head 22. Pin (or pins) 48 may be retracted from the position shown in FIG. 2 to a position shown in FIG. 1. In particular, the end of the pin is positioned above passageway 24 (e.g. substantially flush with the orifice edge 27 and the inner diameter of the concave surface 25). In this position, the lower portion of bore 18, adjacent to outlet opening 46, is no longer occluded by pin. Rams 30, 30' may then be moved inwardly, toward one another (i.e. toward mix head wall 22) to thereby force the mixed material into bore hole 18 toward opening 46. Once all of the mixed material is force out of opening 46 or remains in bore hole 18, pin 48 can be operated toward opening 46 and thereby push an material remaining in bore hole 18 out of opening 46. In particular embodiments, rams 30, 30' may be operated at relatively the same speed and/or force. Force thereby drives the material out of the mixer through outlet opening 46, where it can be captured by an external receptacle for further evaluation. Once the material is removed, rams 30, 30' can be retracted for cleaning and then the next sample is received for mixing.

As suggested above, the mixing apparatus of the present invention is uniquely adapted to receive relatively low viscosity materials (e.g. rubber formulations with an appreciable amount of solvent), perform distributive mixing and desolventization, and then, as the rubber formulation increases in viscosity, perform dispersive mixing. For example, the relatively low viscosity rubber formulations that may be loaded to the mixer may have a dynamic viscosity (at 20° C.) of less than 100, in other embodiments less 50, and in other embodiments less than 20 Pa·s. In these or other embodiments, the rubber formulations may have a dynamic viscosity (at 20° C.) of from about 1 to about 100, in other embodiments from about 2 to about 50, and in other embodiments from about 3 to about 20 Pa·s. As this skilled person will appreciate, dynamic viscosity of a rubber formulation, especially a rubber formulation that includes an appreciable amount of solvent, can be measured by using a rotational viscometer or rheometer such as those available from TA Instruments.

As mixing and desolventization continues, the viscosity of the material being mixed can increase, and the mixer is adapted to perform dispersive mixing on these relatively high viscosity compositions. For example, the mixer is adapted to perform mixing on rubber formulations having a Mooney viscosity (ML 1+4 @ 100° C.) of greater than 20, in other embodiments greater 30, and in other embodiments greater than 40 Mooney Units. In these or other embodiments, the mixer is adapted to perform mixing on rubber formulations having a Mooney viscosity (ML 1+4 @ 100° C.) of from about 20 to about 250, in other embodiments from about 30 to about 175, and in other embodiments from about 40 to about 150 Mooney Units.

Parallel Mixing Through an Array of Mixing Devices

In one or more embodiments, two or more mixers can be arranged into an array, which provides the ability to mix two or more samples simultaneously (i.e. in parallel). Moreover, because the two or more mixers are arranged into an array, the mixer can receive two or more samples that are positioned in a corresponding array, which facilitates handling, throughput, and overall speed of the process. For example, when the precise location of each mixer within the array is known, unmixed polymer samples may be delivered by an automated or robotic process to the array of mixers. In a similar manner, when the mixing operations are complete, an automated or robotic process can remove and transfer the samples from the mixers for further evaluation.

For purposes of this specification, an array refers to two or more mixers that are arranged in a predetermined, organized pattern. In one or more embodiments, the array includes rows and columns of mixers that may optionally be equally spaced from each other. In other embodiments, the array may include a grouping of mixers arranged around a common modal point. Generally speaking, the array fixes the two or more mixers in space so that their location relative to each other and relative to other equipment or machinery working in conjunction with the mixers is known. In one or more embodiments, the array provides for the mixers being placed in close proximity to each other, and in fact connected or interconnected to each other.

In one or more embodiments, the array of mixers may include at least 3, in other embodiments at least 6, and in other embodiments at least 10 mixers. In one more embodiment, the array of mixers may include from 2 to 24 mixers, in other embodiments from 4 to 20 mixers, and in other embodiments from 6 to 12 mixers.

In one or more embodiments, the individual mixers of the array of mixers may be organized into a matrix including rows and columns of mixers situated in parallel configuration relative to one another. In other embodiments, the individual mixers may be organized into a single row of mixers situated in parallel configuration relative to one another.

In one or more embodiments, the two or more mixers may be situated into an array, through direct or indirect attachment, or through a sharing of a lateral surface of two or more mixers. For example, a lateral wall of housing may be shared by two mixers, or may be serve as a point of connection or attachment between two mixers.

In one or more embodiments, the mixers within the array may operate concurrently with each other. In certain embodiments, in order to maintain consistency of the operations and to ensure that the test results are repeatable, all of the mixers are configured with substantially similar components. To this end, the mixers may undergo an evaluation and certification process to ensure that any particular mixer is indistinguishable from the other mixers. Skilled artisans will nonetheless appreciate that different configurations of mixers in the array may be used if it is desired to introduce variables into the mixing process as part of the rubber composition evaluation process. Non-limiting examples of such variables may be the rate of mixing, the temperature at which mixing occurs, the pin configuration provided by each mixer, and variations of other mechanical features such as the shape of the ram heads and the shape of the mix head. Other variables may relate to the amount of off-gassing employed during the mixing operation and so on. It will be appreciated that any variable that may be adjusted during the mixing process is correlated to the sample received.

Mixing Devices in Series

In one or more embodiments, two or more mixers 10 may be positioned in series or in tandem configuration. As a result, a sample mixed within the mixers can be subjected to two mixing steps, which may optionally be conducted under different mixing conditions. As an example, the first mixer in series can be operated at a first mixing energy and/or first mixing temperature, and the second mixer in series can be operated at second mixing energy and/or second mixing temperature. In one or more embodiments, the first mixing energy and/or temperature is greater than the second mixing energy and/or temperature. In one or more embodiments, both the first and second mixers, as well as additional mixers, are consistent with the teachings provided herein. In other embodiments, only one mixer in the series is a mixer as described herein and the other mixers may include conventional mixing devices known in the art.

Figure 10:
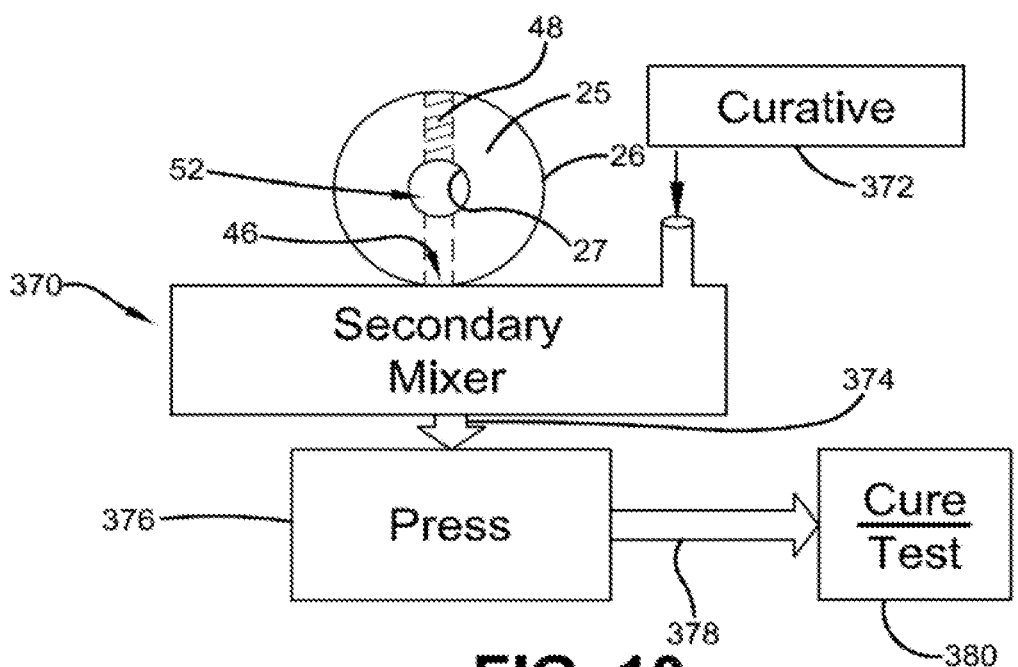
FIG. 10 is schematic view showing a mixer with a pin partially retracted from the mixing head to allow dispensing of the mixed material into a secondary mixer, a press, and a test apparatus with a cure process of one or more embodiments of the present invention.

An example of a mixer arrangement where two or more mixers are positioned in series is shown in FIG. 10 where mixing device 10 is followed in series by a second mixer 370. Second mixer 370 can be attached directly to mixer 10 or placed in fluid communication therewith by using appropriate conduits. In one or more embodiments, second mixer 370 has a similar design to mixer 10. In other embodiments, mixer 370 may be a conventional mixer such as, but not limited to, an impeller mixer, an internal screw mixer, or a two-roll mill mixer.

After the rubber material is mixed within first mixer 10, the material is transferred from first mixer 10 to second mixer 370. In one or more embodiments, additives not introduced into the first mixer, or not fully introduced into the first mixer, are introduced to the rubber material within the second mixer. For example, curatives or a portion of a cure package can be added into second mixer where it is mixed with the rubber material transferred from the first mixer. Mixing within second mixer 370 may take place using lower shear mixing or lower-energy mixing relative to first mixer 10. Mixing within second mixer 370 may also take place at lower temperatures than temperatures experienced within first mixer 10.

Upon completion of the secondary mixing within mixer 370, the rubber material is transferred to down-stream processes such as processes for the analysis of the vulcanizable rubber composition, which may include direct analysis of the vulcanizable composition or pre-analysis steps such as forming and curing steps. For example, as shown in FIG. 10, the vulcanizable composition undergoes transfer at step 374 to a forming device 376, such as a rubber press where the vulcanizable composition is pressed into an appropriate shape suitable for testing and analysis, which may require curing the composition in advance of testing and analysis. For example, after forming device 376, the material may be transferred via transfer step 378 to an analyzer 380, which performs appropriate curing and/or testing processes to evaluate the mixed materials.

Various modifications and alterations that do not depart from the scope and spirit of this invention will become apparent to those skilled in the art. This invention is not to be duly limited to the illustrative embodiments set forth herein.

What is claimed is:

1. An apparatus for mixing polymer, the apparatus comprising:
   (i) a mixer housing including an internal chamber, said internal chamber having first and second sections in fluid communication with each other through a passageway;
   (ii) a first ram received in said first section;
   (iii) a second ram received in said second section
   (iv) a bore hole extending through said housing transverse to said passageway and intersecting said passageway, and
   (v) a pin extending into said bore hole;
   where the apparatus is adapted to receive a composition including polymer within said internal chamber and move said composition between said first and second chambers through said passageway by operation of said first and second rams.

2. The apparatus according to claim 1, where said pin is movable within said bore hole and adapted to partially occlude said passageway when in a first position and adapted to substantially avoid said passageway when in a second position.

3. The apparatus according to claim 1, where the intersection of said passageway and said pin forms a plurality of passageways between said first and second sections.

4. The apparatus according to claim 1, further comprising an actuator coupled to said pin and adapted to selectively move said pin into and out of said passageway.

5. The apparatus according to claim 4, where said actuator is adapted to move said pin out of said orifice such that when both said rams are moved toward said mixing head, the polymer exits said pin hole.

6. The apparatus according to claim 1, where said internal chamber is defined by a diameter, said passageway is defined by a diameter, and said diameter of said internal chamber is larger than the diameter of said passageway.

7. The apparatus according to claim 1, where said pin has a slit extending therethrough.

8. The apparatus according to claim 1, where said pin has a variable configuration.

9. The apparatus according to claim 1, wherein said passageway is disposed between opposed mix head walls, where said opposed mix head walls have a tapered surface.

10. The apparatus according to claim 1, where said mixer housing has at least one vent extending into said chamber.

11. The apparatus according to claim 1, where said first and second rams include contact surfaces adapted to interface with the mix head wall, which serves to facilitate the forcing of said composition through said passageway.

12. The apparatus according to claim 1, where said housing includes a heating or cooling element.

13. A method for mixing a polymer, comprising:
   (i) providing the apparatus of claim 1;
   (ii) charging a composition including a polymer to said internal chamber between said first and second rams;
   (iii) positioning the pin to partially occlude said passageway;
   (iv) moving one of said ram in one of said sections to force the composition through said passageway and into the other of said sections;
   (v) moving the other of said rams to force the composition back through said passageway and into the other of said sections; and
   (vi) repeating the moving of said rams.

14. The method according to claim 13 further comprising after said step of repeating, discharging the composition from the chamber, where said step of discharging includes moving said pin away from said passageway to thereby avoid said passageway and directed said rams toward said passageway to thereby force the composition into a portion of said bore hole.

15. The method according to claim 13, further comprising discharging the composition from the bore hole by operation of the pin.

16. The method according to claim 13, where the composition has a dynamic viscosity of from about 1 to about 100 Pa·s at said step of charging.

17. The method according to claim 14, where the composition has a Mooney viscosity ($ML_{1+4}$ @ 100° C.) of from about 20 to about 250 at said step of discharging.

18. The method according to claim 13, further comprising the step of heating the composition during said steps of moving said rams.

19. The method of claim 13, where said composition includes a solvent, and further comprising the step of venting solvent from the mixer during said step of moving said arms.

20. The method of claim 13, further comprising a step of mixing the composition in a subsequent mixing step in another apparatus after discharging the composition from the chamber.

21. The method of claim 20, where said subsequent step of mixing takes place at conditions different than steps iii, iv, and v.

22. An assembly comprising the apparatus of claim 1 in combination with a second apparatus for mixing polymer.

23. The assembly of claim 22, where the second apparatus for mixing polymer is an apparatus including:
   (i) a second mixer housing including a second internal chamber, said second internal chamber having third and fourth sections in fluid communication with each other through a second passageway;
   (ii) a third ram received in said third section; and
   (iii) a fourth ram received in said fourth section,
   where the second apparatus is adapted to receive a composition including polymer within said second internal chamber and move said composition between said third and fourth chambers through said second passageway by operation of said third and fourth rams.

* * * * *